(No Model.)
A. ZINK.
HUB ATTACHING DEVICE.
No. 368,562. Patented Aug. 16, 1887.
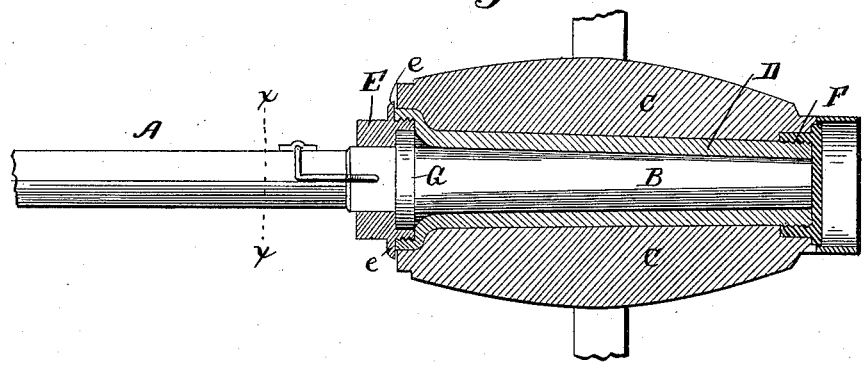
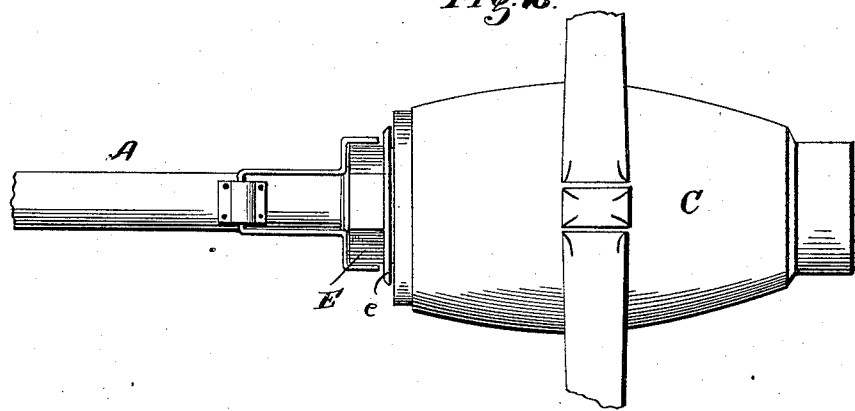
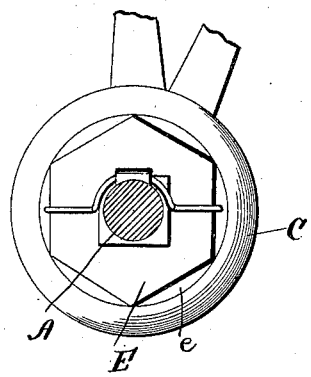
Witnesses
R. C. Lamie
S. Specht
Inventor
Anthony Zink
By his Attorneys
R. S. & A. P. Lacey

UNITED STATES PATENT OFFICE.

ANTHONY ZINK, OF LANCASTER, OHIO.

HUB-ATTACHING DEVICE.

SPECIFICATION forming part of Letters Patent No. 368,562, dated August 16, 1887.

Application filed May 31, 1887. Serial No. 239,876. (No model.)

*To all whom it may concern:*

Be it known that I, ANTHONY ZINK, a citizen of the United States, residing at Lancaster, in the county of Fairfield and State of Ohio, have invented certain new and useful Improvements in Axle-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for securing wheels on their spindles, and has for its object the production of a simple, economical, and efficient means for securing the box or skein in the hub and preventing loss of lubricant, and for securing the wheel to the axle in such manner that all dirt is prevented from entering the space between the box and spindle, and the wheel itself is held more securely to place and can be more quickly removed and adjusted than by any means heretofore known.

The improvement consists in the means for securing the box to the hub, which is an outwardly-flanged cap secured on the smaller end of the box, and having the flange bearing against the hub, and the means for securing the wheel to the axle, which is a nut or its equivalent mounted on the axle and located on that side of the shoulder which abuts against the inner end of the hub opposite the spindle, and is secured to the hub so that the hub and nut revolve together and embrace said shoulder between them.

The improvement further consists of the novel features presently to be described and claimed, and shown in the annexed drawings, in which—

Figure 1 is a front view, parts being broken away, of an axle and wheel embodying my invention; Fig. 2, a top plan view of the parts shown in Fig. 1, and Fig. 3 a section on the line X X of Fig. 1.

The axle A is of usual pattern, and is provided with the shoulder G, for limiting the inward movement of the wheel and dividing the spindle B from the body of the axle.

The box D is of tapering form, and is widened at the larger end to embrace the collar G and leave a space between it and said collar. The interior of this widened portion $d$ is threaded to receive the threaded end of the nut E, which is screwed therein, and has a flange, $e$, to bear against the end of the box and against the end of the hub. The nut is mounted on the axle on that side of the shoulder opposite the spindle, and when screwed to the box embraces the collar G between it and the box and holds the wheel to the spindle. To remove the wheel, the nut may be turned by means of a wrench in the usual manner, or the wrench may be held fast and the wheel rotated. Instead of the wrench, a pronged keeper hinged at its rear to the axle or other suitable support, so as to be turned out of the way, may be provided and turned down so the prongs will extend on each side of and hold the nut while the wheel is being taken off or put on. The cap F is flanged, and is screwed on the smaller end of the box. The flange overlaps and bears against the end of the hub and holds the box thereto. The smaller end of the box is completely closed by the cap, which prevents the loss and escape of lubricant or the ingress of dirt, &c., which grinds away the axle. The shoulder G, being embraced between the nut E on the one side and the box D on the other, holds the wheel firmly to place and prevents dust, sand, and kindred matter finding its way between the box and spindle.

Having thus described my invention, what I claim, and desire to secure by Letters Patent, is—

1. The combination, with the axle having a shoulder at its inner end, the wheel mounted on the spindle on one side of the shoulder, and the nut mounted upon the axle and located on the opposite side of the shoulder, of the keeper, substantially as described, for holding the nut while adjusting or removing the wheel.

2. The combination, with the axle having a shoulder, the hub mounted on the axle on one side of the shoulder, and the nut located on the axle on the opposite side of the shoulder and screwed into the hub, of the pronged keeper hinged at its inner end to the axle, adapted to embrace the sides of the nut at its outer or pronged end, substantially as and for the purpose specified.

In testimony whereof I affix my signature in presence of two witnesses.

ANTHONY ZINK.

Witnesses:
ED WETZLER,
EDSON L. SHAW.